Sept. 4, 1962 P. CARPIGIANI 3,052,381
ANTI-DRIPPING PISTON COCK, PARTICULARLY ADAPTED FOR
DENSE LIQUIDS OF FLUID PASTY SUBSTANCES
Filed Nov. 17, 1959 2 Sheets-Sheet 1
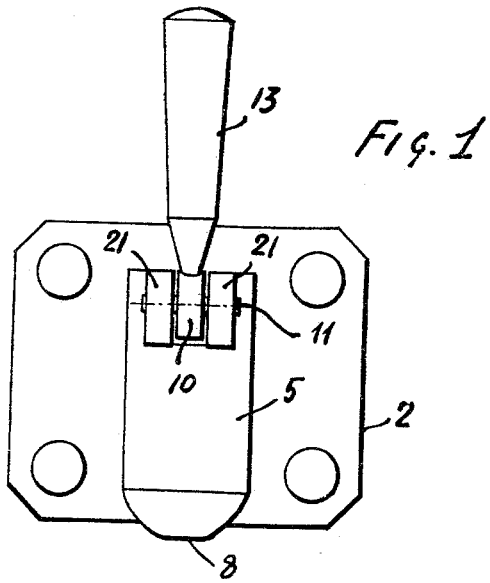
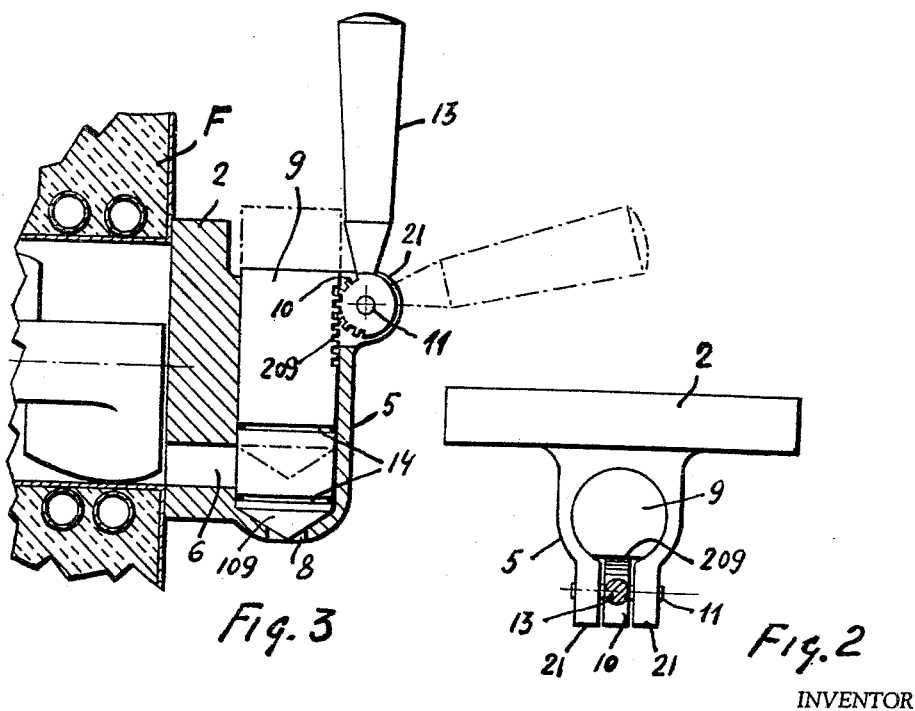
INVENTOR
POERIO CARPIGIANI
BY
ATTORNEYS

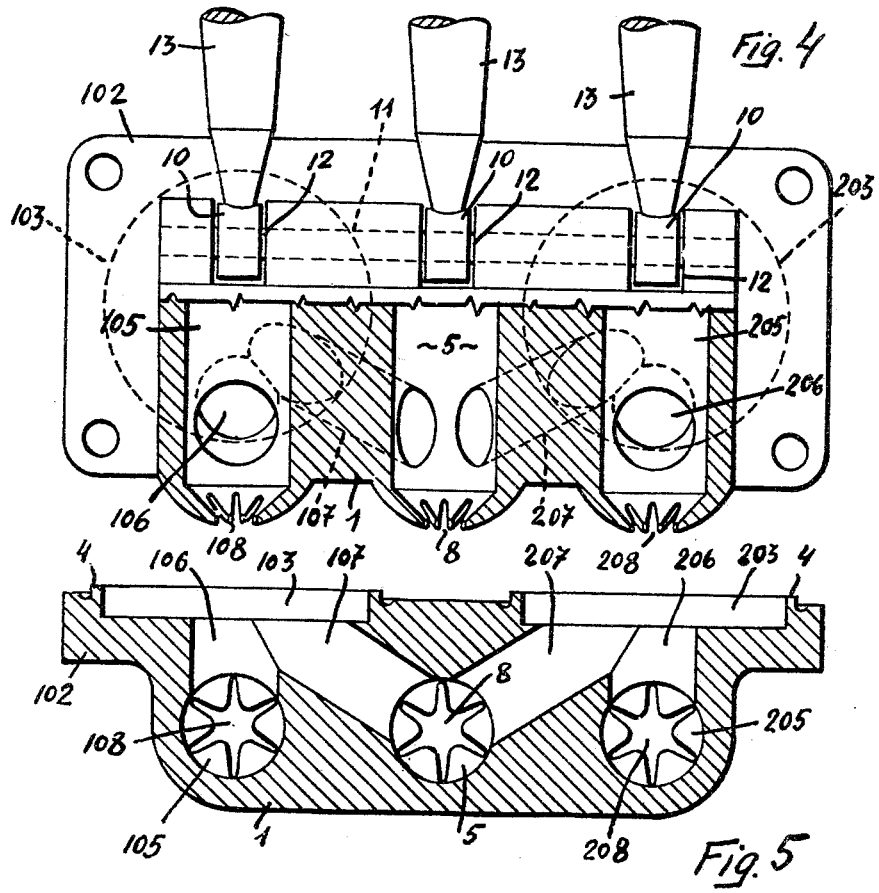
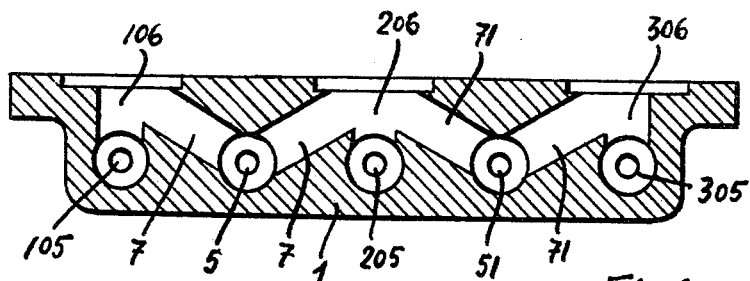

"Patented Sept. 4, 1962"

3,052,381
ANTI-DRIPPING PISTON COCK, PARTICULARLY ADAPTED FOR DENSE LIQUIDS OR FLUID PASTY SUBSTANCES
Poerio Carpigiani, Bologna, Italy
Filed Nov. 17, 1959, Ser. No. 853,547
Claims priority, application Italy Nov. 29, 1958
6 Claims. (Cl. 222—132)

This invention relates generally to piston cocks or valves for use with dense substances, and more particularly to those which may be manufactured at low cost by employing, at least for the essential cock members such as the body or casing and for the piston-shaped plug, non-metallic, substantially heat-insulating materials, such as for instance plastic materials of the class including polyvinyl chlorides, which may also be corrosive resistant.

One of the objects of the invention is to provide a substantially non-metallic anti-dripping piston cock of the kind above referred-to which may be easily cleaned and fitted on the front end of the mixing cylinder or cylinders of machines for the continuous production and distribution of ice cream, some of which are known as "espresso ice cream machines."

The construction of a non-metallic anti-dripping piston cock, besides preventing the dripping of melting ice cream forming a residue sticking to the cock walls when the dispensing of the ice cream is interrupted for a certain time, presents the advantage that the exposed parts of the cock remain at a temperature that is rather near that of the outside air and thus the condensation of the air moisture on the cock and its dripping into the ice cream or on the pavement is practically avoided. This is due to the fact that the cock is made of heat-insulating material.

Another object of the invention is to provide a multiple piston cock, viz. a piston cock composed of a plurality of cock units and which may be fitted on espresso ice cream machines provided with two or more parallel mixing cylinders simultaneously producing different flavored ice cream.

Still another object of the invention is to provide multiple cocks which are adapted not only to dispense the different flavored ice cream separately, but also to dispense, in a single container and simultaneously, two flavors of ice cream which flow into the container in the form of a stream composed of two longitudinally adjoining ice cream flavors and which shall be called "mixed ice cream."

According to the invention, this end is attained by providing between two lateral piston cocks, each communicating with one of a pair of ice cream mixing cylinders, a third like cock or intermediate cock arranged between the said two piston cocks and communicating at its inlet end with the inlet ports of both said cocks, the whole being so arranged that when the intermediate cock is closed, the two ice cream sorts may be dispensed separately from the lateral cocks, while when the said lateral cocks are closed, by opening the intermediate cock, a "mixed" ice cream flow is obtained.

Other objects and peculiar features of the anti-dripping piston cock according to the invention will be apparent from the following specification, made with reference to the attached drawings, in which:

FIGURE 1 is a front elevation of a single piston cock according to the invention;

FIGURE 2 is a plan view of the same cock, with the handle broken away;

FIGURE 3 is a vertical cross section through the centre portion of the cock shown in FIGURE 1;

FIGURE 4 is a front elevation with the lower portion in section illustrating a multiple cock comprising two cocks for dispensing one-flavor ice cream and a cock for dispensing mixed flavor ice cream; the piston plugs of the cock being omitted for clearly showing the various ducts;

FIGURE 5 is a horizontal cross section through the body of the cock shown in FIGURE 4, and FIGURE 6 is a horizontal section showing another arrangement of a multiple cock.

With reference to FIGURES 1 to 3 of the drawings, the improved piston cock comprises a cylindrical body or cylinder 5 open at its top end and partially closed at its bottom end by an in-turned flange forming a substantially conical perforated bottom and leaving a suitably wide outlet port 8 open.

The cylinder 5 is provided at its front top with a vertical slot and a pair of bored lugs 21 through which a pivot pin 11 is inserted. The said cylinder 5 is integral with a plate 2 which is provided with a feed duct 6 which opens into the interior of the cylinder 5, in a position slightly above the said outlet port 8.

In the cylinder 5 a piston 9 is slidably mounted, which is preferably constituted by a block which fills the said cylinder completely and is cone-shaped at its bottom end 109 so as to bear snugly against the similarly shaped bottom end of said cylinder. In one side of the top part of the piston 9 a rack 209 is formed or fitted and meshes with a toothed sector or pinion 10 formed on or attached to the end of a control handle 13 which is pivoted between the lugs 21.

In the piston body two annular grooves are preferably formed in such a position as to remain, with the cock in closed position, one above and the other below the feed duct 6. In each of said grooves a packing ring 14 is inserted which ensures perfect tightness even under considerable liquid pressures.

The operation is apparent by looking at FIGURE 3, which shows the cock mounted at the end of the mixing cylinder of a continuous ice-cream freezer F: In fact, when the handle 13 is in vertical position (shown in full lines) the piston 9 closes the outlet of the duct 6 with its side wall and the two packing rings 14 do not permit any leakage of liquid between the cylinder and the piston. By pulling downwardly the handle 13 the piston 9 is lifted so as to uncover, in part or completely (see dotted-line position) the outlet of the duct 6 and to permit the discharge of the liquid or pasty product through the outlet port 8. By again closing the cock, in its downward stroke, it expels from the cylinder end the entire product contained therein, thus preventing dripping of the liquid adhering to the cock body or also of the melting ice cream residue.

In FIGURES 4 and 5 a multiple piston cock is shown, which comprises three cylinders 5, 105 and 205 arranged in a row and formed in a body block 1 of plastic material, in a single piece with a back plate 102 having a projecting edge portion or flange by means of which the cock may be fastened, as by screws (not shown) to the front plate of an ice cream freezer provided with a pair of horizontal parallel mixing cylinders like that whose end is shown in FIGURE 3.

The side cylinders 105 and 205 are each connected by means of a wide duct 106 and 206, respectively with shallow ice cream-collecting and distributing chamber 103 and 203 preferably provided with a projecting edge 4 fitting exactly into the end of the mixing cylinders of the ice cream freezer and spaced like said pair of mixing cylinders. The middle cylinder 5, which is formed like the said two side cylinders 105 and 205 communicates with both the collecting chambers 103 and 203 through a pair of ducts 107 and 207 formed into the mass of the body block 1.

In each of said cylinders 5, 105, 205 a piston like that shown in FIGURE 3 is mounted in like manner as in the first embodiment.

The operation is apparent: When the outlet of the middle cylinder is closed, by operating either of the side cocks, a single-flavored ice cream is dispensed through either outlet 108, or 208, accordingly to which side cock is opened.

When however the side cocks are closed and the middle cock is opened, a mixed ice cream is dispensed through the outlet 8.

As shown in FIGURE 5, the dispensing outlets are preferably star-shaped, for a better appearance of the exposed part of the dispensed ice cream.

FIGURE 6 shows a multiple cock comprising three cocks 105, 205, 305 each connected to an inlet duct 106, 206, 306 adapted to be put into communication with a separate container or mixing cylinder (not shown). Between two of said cocks, viz. 105 and 205 a further cock 5 is fitted and between the cocks 205 and 305 another cock 51 is arranged. A pair of ducts 7 lead from the inlet ends of ducts 106 and 206 to cock 5 and a pair of ducts 71 lead from the inlet ends of ducts 206 and 306 to cock 51. As it is apparent, the cocks 5 and 51 are mixing cocks from which two different mixtures are obtained, in the same manner as described with reference to FIGURES 4 and 5.

From the foregoing, it is apparent that the cocks according to the invention may undergo numerous changes, particularly as regards their construction, without departing from the spirit of the invention.

Thus, although particularly for multiple cocks to be fitted on a continuous ice cream freezer it is convenient to adopt as attachment member a plate or the like, it is to be understood that the cocks according to the invention may be also provided with conventional tubular connecting members, which may also be screw-threaded, if necessary.

Furthermore, although the pinion-and-rack control system is one of the best suited for this particular cock type, it is to be understood that instead of this another control system for slidable valves may be adopted.

It might be also noted that the cock may be made—perhaps with the only exception of the pin 11—non-metallic material, which is a great advantage particularly in ice cream dispensers and in containers of corrosive and dense liquids or pasty substances.

I claim:

1. A piston cock unit for dense or pasty substances such as ic-cream, comprising a cylinder formed of non-metallic heat insulating material disposed substantially vertically and open at its top and closed by a bottom wall provided with an outlet port, a feed duct for feeding the pasty substance to the cylinder to a feed port opening in said cylinder slightly above its bottom wall, a piston substantially filling said cylinder slidably mounted within the cylinder between upper and lower positions and covering said feed and outlet ports in its lower position, a pair of parallel, spaced grooves formed in the lower part of said piston, a packing ring in each of the said grooves, said grooves and rings being positioned one above and the other below said feed port in the lower position of said piston, both said packing rings being disposed above said feed port in the upper position of the piston, a vertical row of rack-like indentations formed in said piston near its upper end, a slit in the upper portion of the cylinder, a toothed sector pivotally mounted in said slit and meshing with said rack-like indentations of the piston, and an operating handle fixed to said toothed sector to rotate the same so as to shift said piston between said lower position in which it closes both the feed duct port and the outlet port and said upper position in which both the feed port and the outlet port are open and in communication with each other.

2. A piston cock unit according to claim 1 wherein the bottom face of said piston is convex and the bottom wall of the cock cylinder having the outlet port is concave to complement the shape of the bottom face of the piston, whereby the convex end of the plug closely fits and fills the bottom end of the cock cylinder in the said lower position of the piston.

3. A multiple cock unit for dense or pasty substances such as ice-cream, comprising a pair of cylinders formed of non-metallic heat insulating material disposed substantially vertically and open at their tops, said cylinders being closed by bottom walls each provided with an outlet port, a pair of feed ducts for feeding pasty substance to be dispensed from a plurality of sources to said pair of cylinders and each connected to a feed port opening in one of said cylinders slightly above its bottom wall, each of said cylinders being open at its top and provided with a piston substantially filling the cylinder slidably mounted to move between upper and lower positions with said lower position covering said feed and outlet ports, a pair of parallel spaced grooves formed in the lower part of each piston, a packing ring in each of said grooves, said grooves and rings being positioned one above and the other below the associated feed port in the lower position of said piston, both said packing rings being disposed above the associated feed port in the upper position of the piston, means for moving said pistons from the exterior of the unit to shift them between said upper and lower positions, a third cylinder identical with said pair of cylinders and having a movable piston identical with the pistons in said pair of cylinders, said third cylinder being provided with a pair of feed ducts each of which communicates respectively with one of the feed ducts to said pair of cylinders, whereby moving of the piston in the third cylinder to close its pair of feed ducts enables the separate dispensing of separate substances from each of said pair of cylinders and moving the piston in said third cylinder to its upper position to open its outlet and feed port enables the dispensing of a mixture of substances from said pair of feed ducts connected to said pair of cylinders.

4. A unit according to claim 1, in which the body includes a plate, and means for permitting the fitting of said plate to the front of a continuous ice-cream machine, with said duct in communication with the outlet end of an ice-cream container of said machine.

5. A unit according to claim 1, in which the body is made in one piece of heat-insulating plastic material of the class including the polyvinyl chlorides.

6. A unit according to claim 1, in which the body and its piston are both made of non-metallic plastic material.

References Cited in the file of this patent

UNITED STATES PATENTS

| | | |
|---|---|---|
| 2,169,393 | Rice | Aug. 15, 1939 |
| 2,697,446 | Harrington | Dec. 21, 1954 |
| 2,825,491 | Engstrom | Mar. 4, 1958 |
| 2,888,040 | Terwilliger et al. | May 26, 1959 |
| 2,921,605 | Booth et al. | Jan. 19, 1960 |